United States Patent
Montesinos et al.

(10) Patent No.: US 11,306,853 B2
(45) Date of Patent: Apr. 19, 2022

(54) FLOATING LOAD RING FOR FLEXIBLE JOINT

(71) Applicant: American BOA, Inc., Cumming, GA (US)

(72) Inventors: Jose F. Montesinos, Alpharetta, GA (US); Rolf Janssen, Atlanta, GA (US); Srinivas Gade, Cumming, GA (US)

(73) Assignee: American BOA, Inc., Cumming, GA (US)

( * ) Notice: Subject to any disclaimer, the term of this patent is extended or adjusted under 35 U.S.C. 154(b) by 271 days.

(21) Appl. No.: 14/824,670

(22) Filed: Aug. 12, 2015

(65) Prior Publication Data
US 2016/0053929 A1 Feb. 25, 2016

Related U.S. Application Data

(60) Provisional application No. 62/040,138, filed on Aug. 21, 2014.

(51) Int. Cl.
*F16L 51/02* (2006.01)
*F16L 27/10* (2006.01)
(Continued)

(52) U.S. Cl.
CPC .......... *F16L 35/00* (2013.01); *F01N 13/1816* (2013.01); *F16L 27/1004* (2013.01);
(Continued)

(58) Field of Classification Search
CPC ..... F16L 35/00; F16L 27/1004; F16L 27/107; F16L 27/11; F16L 27/111; F16L 51/025–027
(Continued)

(56) References Cited

U.S. PATENT DOCUMENTS 4,911,482 A * 3/1990 Doat ............... F16L 27/073
  277/506
5,775,737 A * 7/1998 Morgner ........... F16L 51/025
  285/49
(Continued)

FOREIGN PATENT DOCUMENTS

DE 4243115 A1 7/1993
DE 9404814 U1 * 5/1994 ............ F16L 58/18
(Continued)

OTHER PUBLICATIONS

International Searching Authority, Search Report and Written Opinion issued in Corresponding International Application No. PCT/IB2015/001361 dated Nov. 5, 2015.

*Primary Examiner* — Matthew Troutman
*Assistant Examiner* — Fannie C Kee
(74) *Attorney, Agent, or Firm* — Wood Herron & Evans LLP (57) ABSTRACT

A free-floating load ring for assembly into a flexible coupling having a convoluted bellows and a surrounding mesh sleeve, the ring captured by the sleeve at an end of the coupling and spacing the sleeve from the bellows when forces are applied to the coupling. Various rings can be added to existing non-load supporting or flexible couplings having no previous rings. The load ring is retained in place by engagement of coupling components with the ring without physical connection of the ring to any coupling component.

3 Claims, 11 Drawing Sheets (51) Int. Cl.
*F16L 27/111* (2006.01)
*F16L 35/00* (2006.01)
*F01N 13/18* (2010.01)

(52) U.S. Cl.
CPC ........... *F16L 27/111* (2013.01); *F16L 51/025* (2013.01); *F16L 51/026* (2013.01); *F16L 51/027* (2013.01); *F01N 2260/10* (2013.01); *F01N 2260/18* (2013.01); *F01N 2310/14* (2013.01)

(58) Field of Classification Search
USPC .......................................... 285/115, 226–229
See application file for complete search history.

(56) References Cited

U.S. PATENT DOCUMENTS

| | | | |
|---|---|---|---|
| 5,813,704 A | 9/1998 | Naito | |
| 5,967,565 A * | 10/1999 | Kim | F01N 13/1811 285/49 |
| 6,230,748 B1 | 5/2001 | Krawietz et al. | |
| 6,354,332 B1 * | 3/2002 | Burkhardt | F16L 11/15 138/109 |
| 6,848,478 B2 | 2/2005 | Nagai | |
| 6,902,203 B2 | 6/2005 | Kang | |

FOREIGN PATENT DOCUMENTS

| | | | | |
|---|---|---|---|---|
| DE | 202005013341 U1 | 10/2005 | | |
| EP | 0657683 A2 | 6/1995 | | |
| EP | 0709558 A1 | 5/1996 | | |
| EP | 0657683 A3 | 7/1996 | | |
| EP | 0810354 A1 * | 12/1997 | ......... | F01N 13/1816 |
| EP | 1576263 B1 | 6/2006 | | |
| EP | 2450546 A1 | 5/2012 | | |
| FR | 2644552 A1 * | 9/1990 | ............ | F16L 27/073 |
| GB | 855356 A * | 11/1960 | ............ | F16L 51/027 |

* cited by examiner

FLOATING LOAD RING FOR FLEXIBLE JOINT

PRIORITY CLAIM

Applicant claims the benefit of the filing date of Aug. 21, 2014 of U.S. Provisional Patent Application Ser. No. 62/040,138, which application is incorporated herein by express reference.

FIELD OF THE INVENTION

This invention relates to flexible "flex" couplings or joints for use with pipes in environments of noise, vibration or harshness (NVH) such as the exhaust pipes or conduits of an internal combustion engine. More particularly, this invention relates to load rings facilitating use and longevity of braid-covered bellows and the like wherein an outer braid sleeve could, without the invention, contact or load a surrounded bellows and unduly wear, permanently deform and/or fatigue it where the bellow is exposed to an unsupported load.

BACKGROUND OF THE INVENTION

Known flexible couplings typically include a convoluted bellows surrounded by a flexible braided sleeve. In an effort to prevent exerting loads on the bellows resulting from braid contact when environmental loads are imposed at the coupling, the coupling is designed to accept or include load rings cooperating with end components of the couplings.

The disadvantage of such known couplings appears in the requirement of different end components at the end of the coupling between a load supporting and non-load supporting version of the flexible element. A flexible element or coupling with load-supporting properties requires a load ring placed in between the bellows and braid, while the non-load supporting coupling does not. The end of the load-supporting flexible element has the load ring mounted on the bellows neck, then the braid is placed over this ring and finally an end ring cap is placed on top of all components. This configuration requires a different end ring cap when building a non-load supporting flexible coupling due to the empty gap created by the absence of the load ring in the non-load supporting coupling. Thus the couplings are particularly designed to accept the load rings and it is either difficult or not practical to provide non-load supporting couplings with load rings where the coupling is not initially designed to accept them. This requires more inventory and prevents provision of load rings to existing non-load supporting coupling configurations. Said in another way, existing ring designs require modification or re-design of end components to accommodate any prior load ring.

SUMMARY OF THE INVENTION

The invention comprises a floating load ring placed in between the bellows and the braid. The load ring is held in place upon all the components at the end of the flex coupling being secured together. The load ring will not be attached to the adjoining pipes or coupling bellows by any weld as are the other components at the end of the coupling. The load ring can take infinite shapes and geometry. The invention contemplates integration of a floating load ring into the flexible coupling without needing to modify any of the existing coupling elements or components. The materials used for the ring components can be solid metal, compressed steel mesh wires, polymers, composites, or other suitable materials.

The main advantage of this invention is that it can be added to existing non-load supporting flexible couplings and transform them into load-supporting flexible couplings without changing the design of any of the existing components in the flexible coupling and without manufacturing steps to attach the load rings in place. The invention reduces the costs and complexity of manufacturing interchangeability between load supporting and non-load supporting capability in the flexible coupling design. Also, the invention can be added to existing flex elements of the load-bearing type couplings to achieve similar benefits as those herein noted, i.e. reducing loads and wear on the bellows.

The present invention improves the durability of the flexible coupling when exposed to dynamic unsupported loads by distributing the loads onto the floating rings at the end of the coupling rather than concentrating them on the surfaces of the convoluted bellows.

The invention thus presents structures and methods for effectively compensating static and dynamic loads, and motion initiated by thermal and mechanical origins as well as noise, vibration and harshness (NVH), and other such concerns. The independent nature of the floating rings promotes lower cost products by reducing the variation between the component designs required at the end of the flexible coupling.

DETAILED DESCRIPTION OF THE INVENTION

It should be readily understood that the profile geometry of the invention, as generally described and illustrated in the Figures herein and accompanying text, can be designed in a wide variety of shapes while still utilizing the inventive concept.

Figure 3:
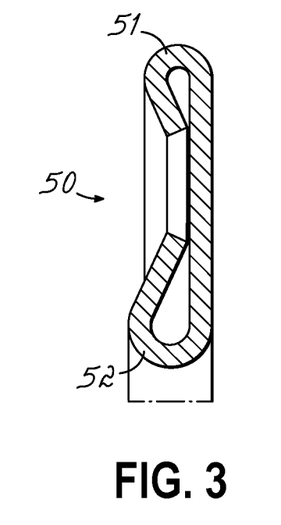
FIG. 3 is a cross-section of an embodiment of a load ring of the invention as in FIG. 1.
Figure 5:
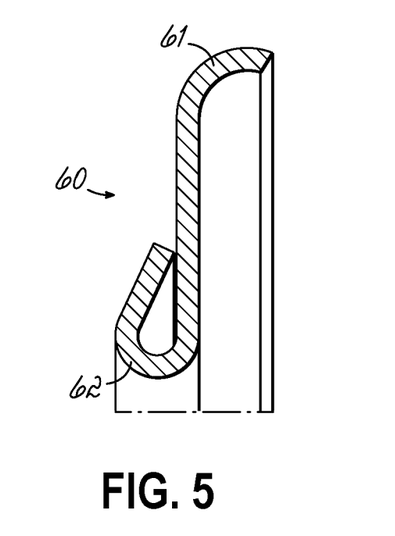
FIG. 5 is a cross-section of an alternate embodiment of a load ring of the invention.

For example, the radii of the loops in the load rings shown in FIG. 3 and FIG. 5 can be smaller or larger. Also, a load ring could be a solid piece without any loops and with round or square edges.

Thus, the following more detailed description of the preferred embodiments of the invention, as presented in the figures and accompanying text, is not intended to limit the scope of the invention, but it is merely to represent the preferred and alternative embodiments of the invention.

The embodiments of the invention will be best understood by reference to the drawings wherein like parts and configurations are designated by like numerals throughout. In the FIGS., ring and bellows are generally annular about a center-line axis and are generally symmetrical thereabout.

Also note that the terms "flex" and "coupling" may sometimes be used interchangeably herein. When modified according to the invention, the "flex" or "coupling" includes a flexible bellows of multiple convolutions, an inner interlock liner or tube, a braided sleeve, end fittings and free floating load rings as described.

Various loads exerted on the couplings described herein are lateral, such as when loads, radially and perpendicularly to the coupling axis, are exerted on the coupling (in the case of parallel but spaced pipes coupled at each end of the coupling); extension loads such as when the coupling ends are biased apart in an axial direction and bending, such as when the coupling is bent along its elongated center axis.

Without the floating load ring of the invention each of these forces can cause braid to bellows contact, wearing, deforming or fatiguing the coupling.

Figure 1:
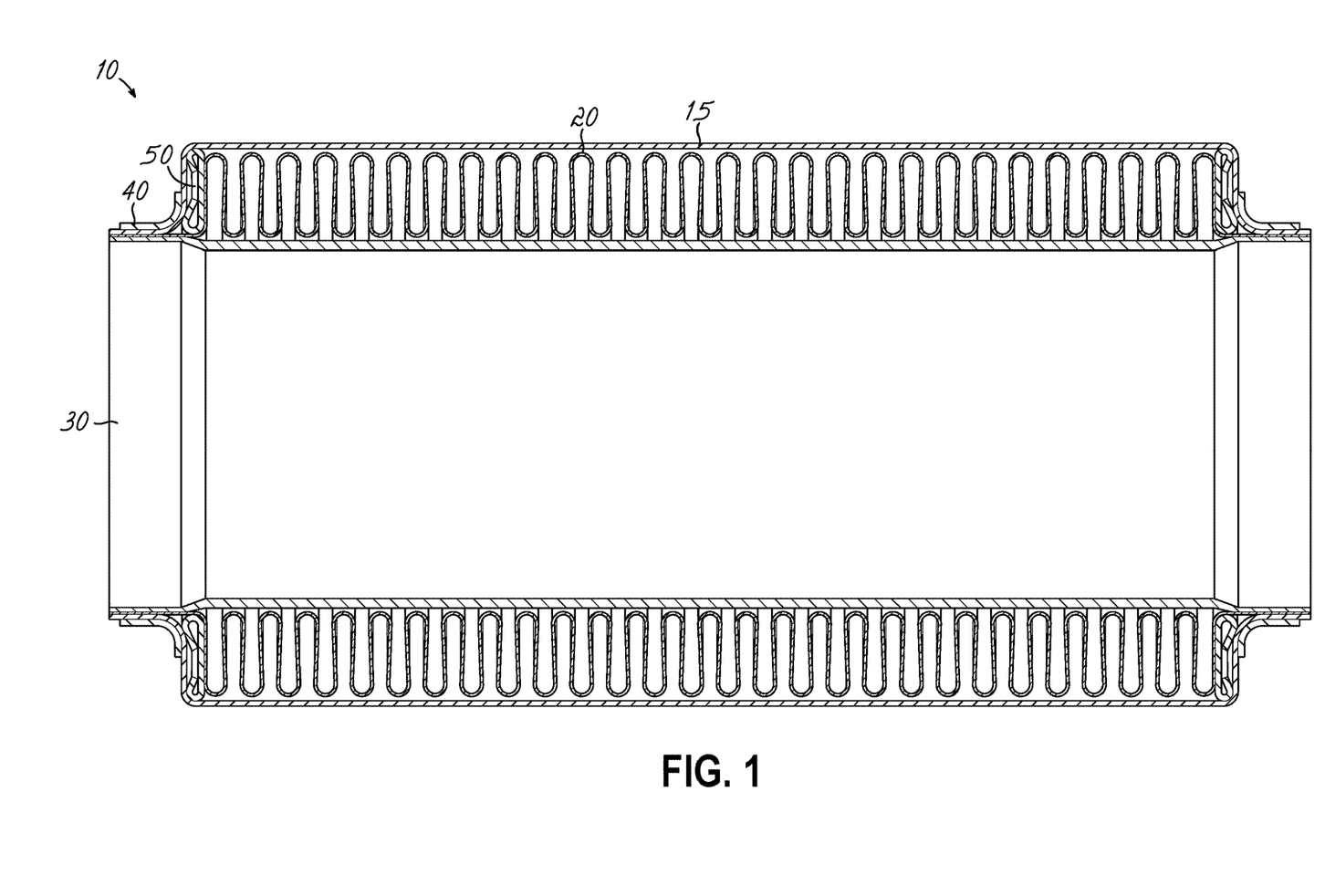
FIG. 1 is a cross-section view of one embodiment of the invention shown integrated into a full assembly of the load-supporting capable flexible element coupling.
Figure 2:
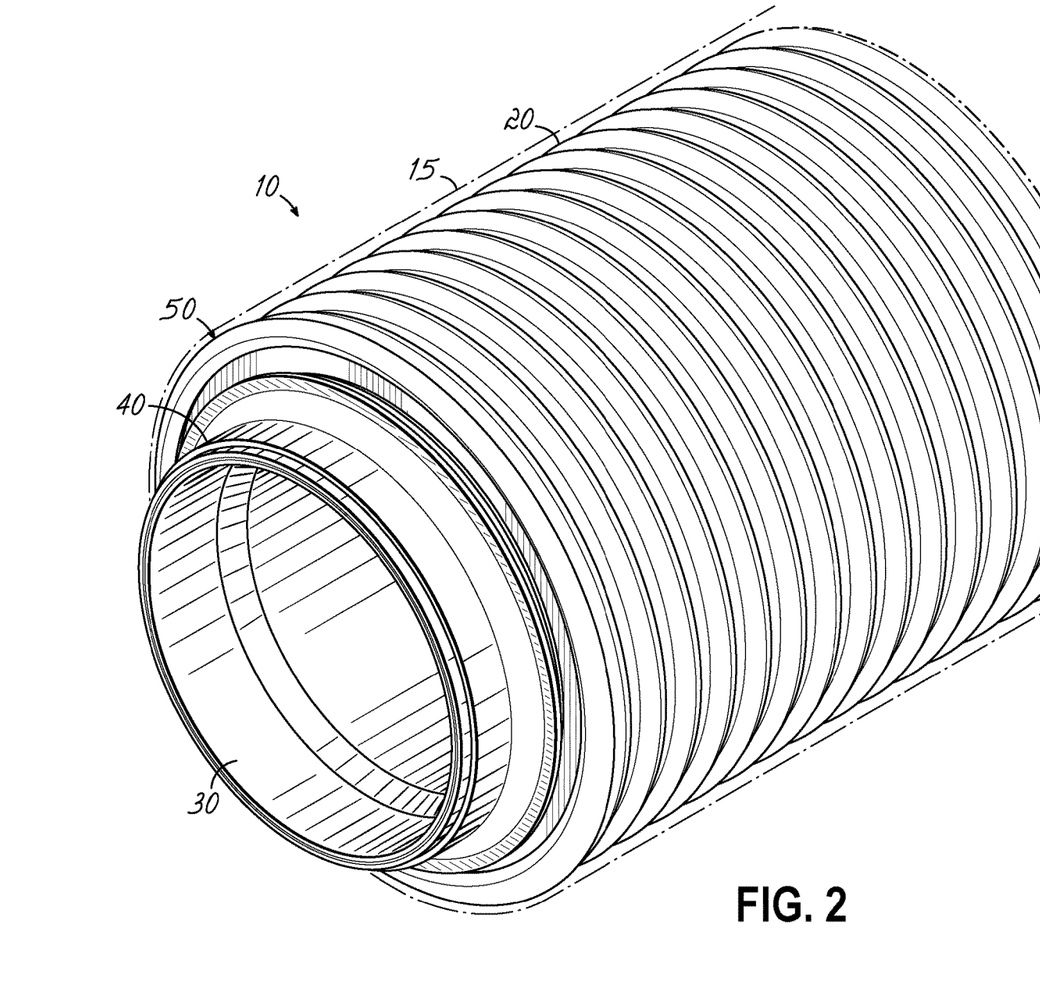
FIG. 2 is an isometric view of the invention in FIG. 1 with the over braid illustrated in phantom.
Figure 4:
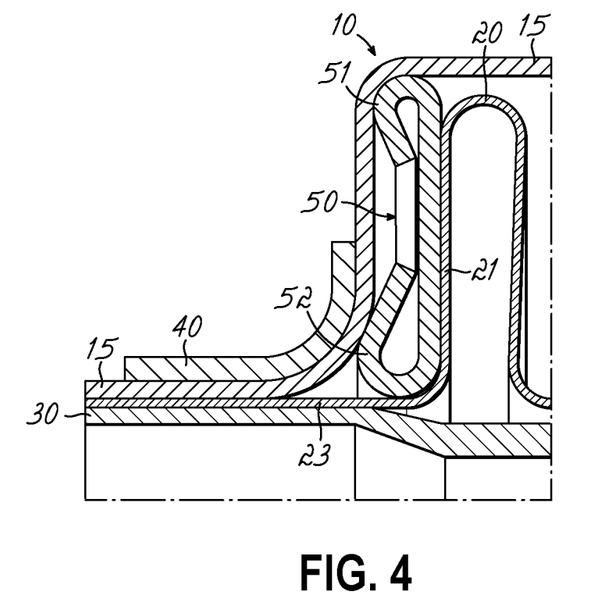
FIG. 4 is a cross-section of the invention in FIG. 3 shown in place in an end of a full flexible coupling assembly.

Referring to FIG. 1, a full coupling assembly according to the invention illustrates a load supporting flexible coupling 10 including braid or mesh 15, bellows 20, an inner liner commonly known as interlock 30, an end ring 40, and a load ring 50, such as shown in FIGS. 2-4.

Referring to FIG. 2, the floating load ring 50 is integrated at the end of the flexible coupling 10 independently of the diameter of the end ring 40, and is integrated, without welding, into the existing assembly gaps between the components of the coupling 10. The ring 50 is secured in the coupling 10 once all the other components are installed and in mere engagement with mesh 15 and end of bellows 20. The manufacturing advantage of the invention is that it does not require a change of the existing components of the coupling 10 or the tooling/machinery required for assembly. The functional advantage of the invention is that when a high displacement/weight load is applied to the coupling 10, ring 50 provides a full lock in extension protecting the bellows 20 and interlock liner 30 from being plastically deformed. This is accomplished by dissipating the forces from the braid 15 into the connecting end of the flex hose, as in FIGS. 2 and 4, by ring 50.

In this embodiment, ring 50 is an annular ring with annular reverse bend flanges or loops 51, 52 as shown in FIG. 3. Ring 50 carries loads exerted by braid 15. Loop 52 dissipates the load from loop 51 onto the end of the flexible coupling 10 (i.e. at the annular end 23 of bellows 20 and the interlock liner 30 as in FIG. 4).

Referring to FIG. 4, the end of the coupling 10 is shown with ring embodiment 50 integrated into the flexible coupling 10 assembly. Embodiment 50 is held in place against the end 21 of bellows 20 by the end ring 40 and braid 15.

Figure 6:
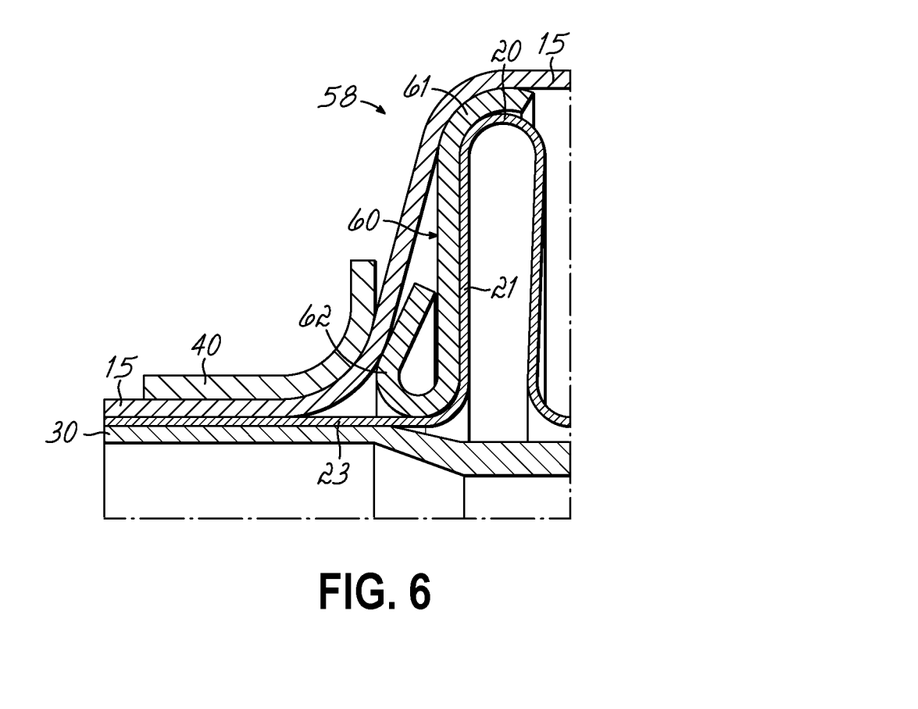
FIG. 6 is a cross-section of the invention in FIG. 5 shown in place in an end of a full flexible coupling assembly.

FIG. 5 illustrates an alternate embodiment of a floating load ring 60 shown in a flexible coupling 58 (FIG. 6). This embodiment includes a bend flange 61 and a loop 62. Bend 61 carries the load from the braid 15. Loop 62 dissipates the load from bend 61 onto the end 23, 30 of the components of coupling 58.

Referring to FIG. 6, the end of the coupling 58 is shown with floating load ring 60 integrated into the coupling assembly 58. Ring 60 is held in place by the end ring 40 and braid 15 against bellow portion 21.

Figure 7:
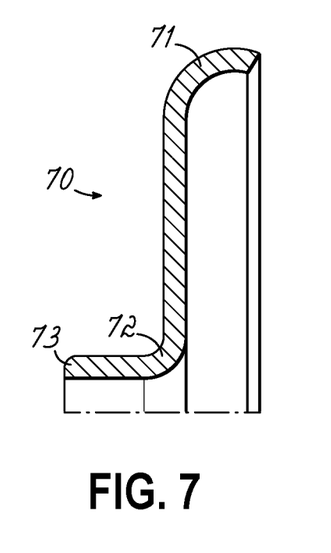
FIG. 7 is a cross-section of an alternate embodiment of a load ring of the invention.
Figure 8:
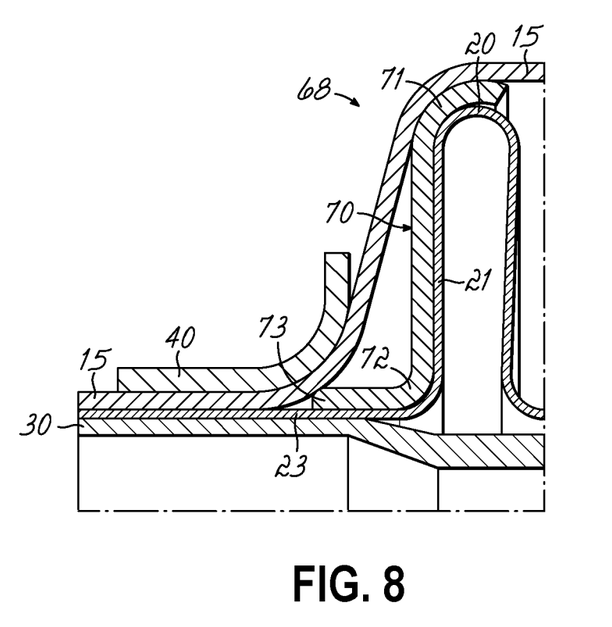
FIG. 8 is a cross-section of the invention in FIG. 7 shown in place in an end of a full flexible coupling assembly.

FIG. 7 illustrates a further alternate embodiment floating load ring 70 in a flexible coupling 68 (FIG. 8). This embodiment includes two bends, 71 and 72. Bend 71 carries the load from the braid. Bend 72 dissipates the load from bend 71 into the end of the flex coupling. Flange 73 of ring 70 provides a low stress concentration contact surface to the bellow end 23.

Referring to FIG. 8, the end of the coupling 68 is shown with ring 70 integrated into the coupling 68 assembly. Ring 70 is held in place against the bellow 20, 21 by the end ring 40 and braid 15.

Figure 9:
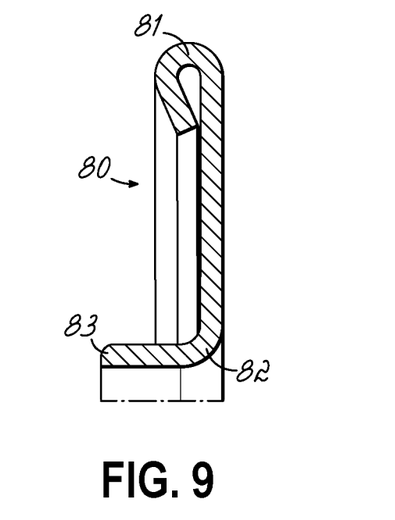
FIG. 9 is a cross-section of an alternate embodiment of a load ring of the invention.
Figure 10:
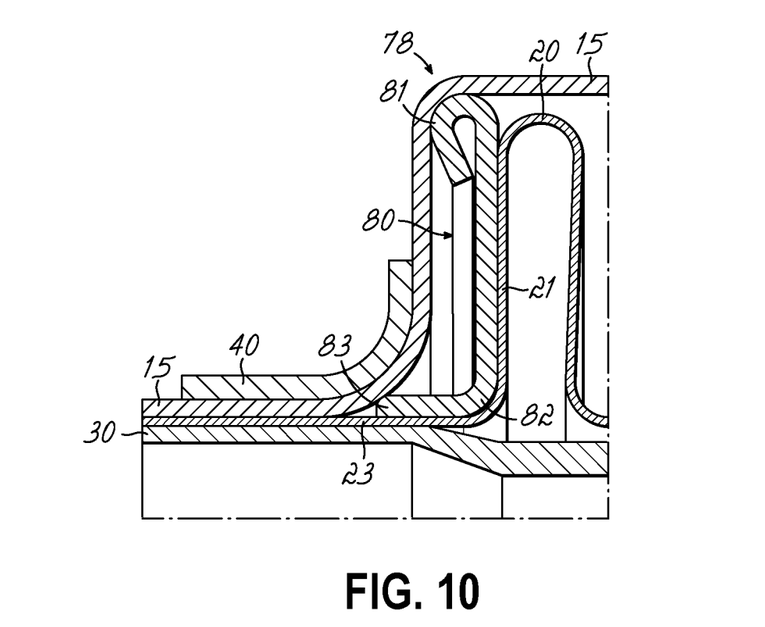
FIG. 10 is a cross-section of the invention in FIG. 9 shown in place in an end of a full flexible coupling assembly.

FIG. 9 illustrates an alternate embodiment of a floating load ring 80 for a flex coupling 78 (FIG. 10). This embodiment includes loop 81 and bend 82. Loop 81 carries the load from the braid. Bend 82 dissipates the load from loop 81 onto the end of the flex hose. Flange 83 provides a low stress concentration contact surface to the braid.

Referring to FIG. 10, the end of the flexible coupling 78 is shown with ring 80 integrated into the coupling 78. Ring 80 is held in place against bellow 20 (21) by the end ring 40 and braid 15.

Figure 11:
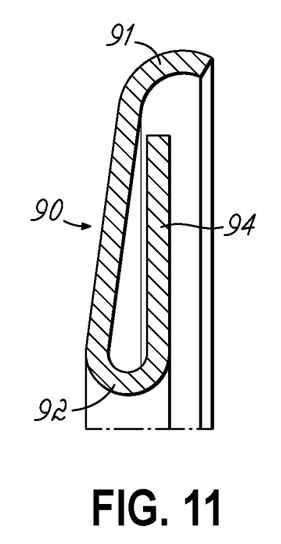
FIG. 11 is a cross-section of an alternate embodiment of a load ring of the invention.
Figure 12:
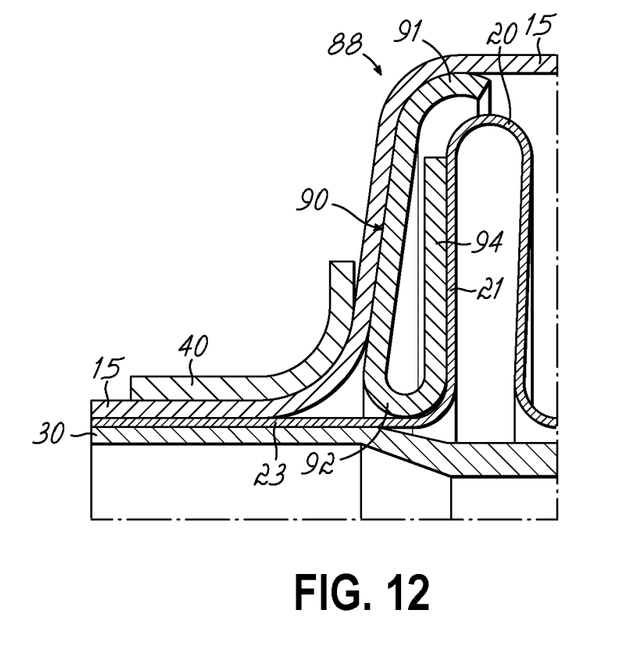
FIG. 12 is a cross-section of the invention in FIG. 11 shown in place in an end of a full flexible coupling assembly.

FIG. 11 illustrates an alternate embodiment of a floating load ring 90 for a flexible coupling 88 (FIG. 12). This embodiment includes bend 91 and loop 92. Bend 91 carries the load from the braid. Loop 92 dissipates the load from bend 91 into the end of the coupling 88 (i.e. bellows 20 end 23 and interlock liner 30). The leg 94 extended from loop 92 can be set with a determined stiffness so that it acts like a spring against the end convolution 21 of bellows 20. This would add multiple stiffness properties to the coupling 88.

Referring to FIG. 12, the end of the coupling 88 is shown with ring 90 integrated into the flex hose assembly. Ring 90 is held in place against bellow convolution 21 and braid 15.

Figure 13:
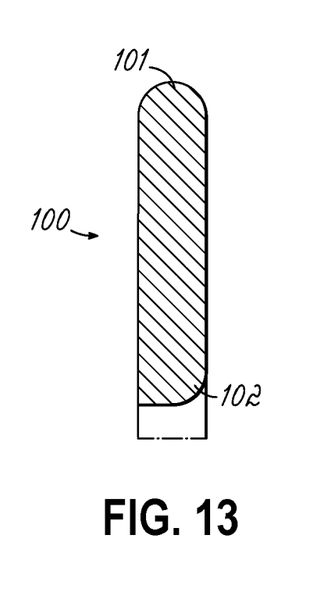
FIG. 13 is a cross-section of an alternate embodiment of a load ring of the invention.
Figure 14:
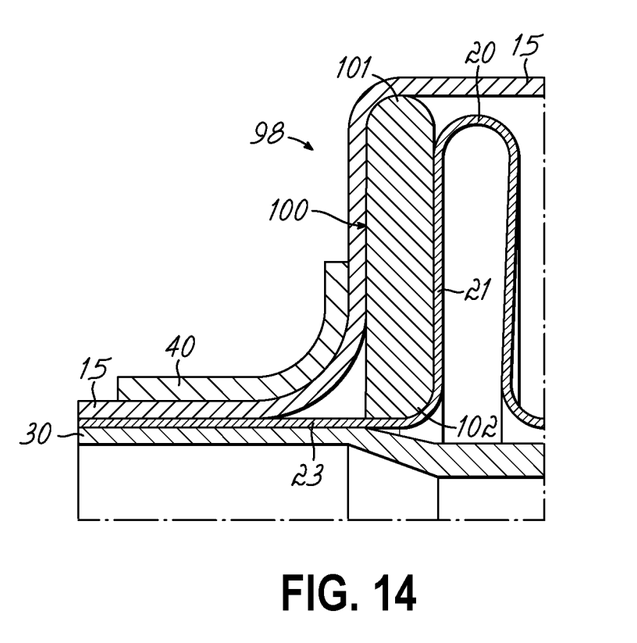
FIG. 14 is a cross-section of the invention in FIG. 13 shown in place in an end of a full flexible coupling assembly.

FIG. 13 illustrates an alternate embodiment of a floating load ring 100 for use in a flexible coupling 98 (FIG. 14). This embodiment includes an integral solid body ring with curved ends or edges 101 and partially curved interior end or edge 102. End 101 carries the load from the braid 15. End 102 dissipates the load from end 101 into the end of the coupling 98 (i.e. bellows 20 and interlock 30).

Referring to FIG. 14, the end of the coupling 98 is shown with ring 100 integrated into the coupling 98 assembly. Ring 100 is held in place against bellow convolution 21 by the end ring 40 and braid 15.

Figure 15:
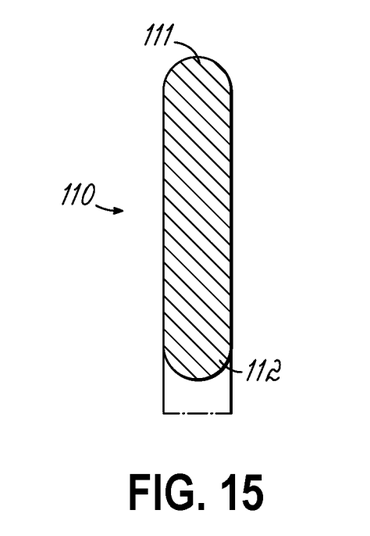
FIG. 15 is a cross-section of an alternate embodiment of a load ring of the invention.
Figure 16:
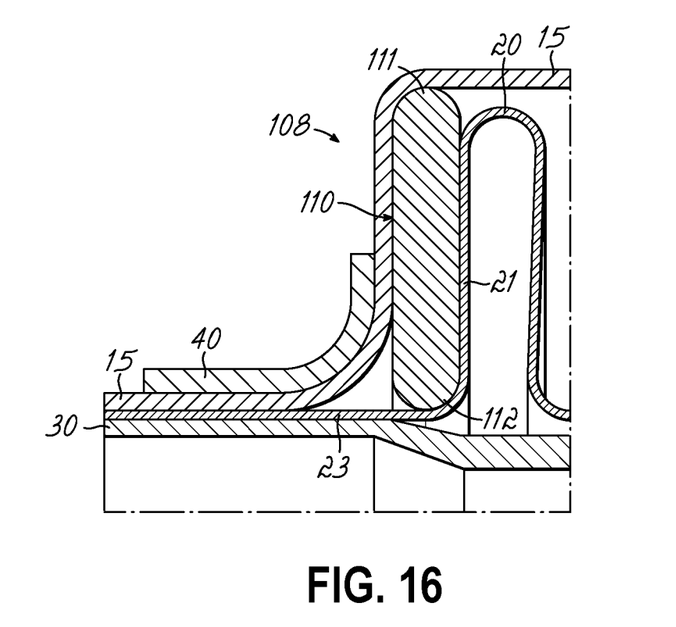
FIG. 16 is a cross-section of the invention in FIG. 15 shown in place in an end of a full flexible coupling assembly.
Figure 17A:
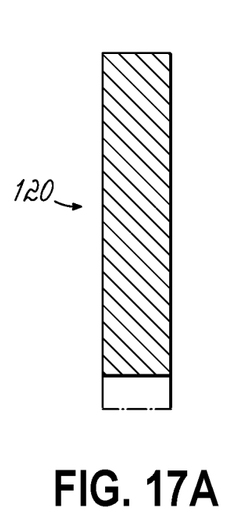
FIGS. 17A, 17B, 17C and 17D illustrate a plurality, in cross-section, of four different alternate embodiments of annular load rings of the invention.
Figure 17B:
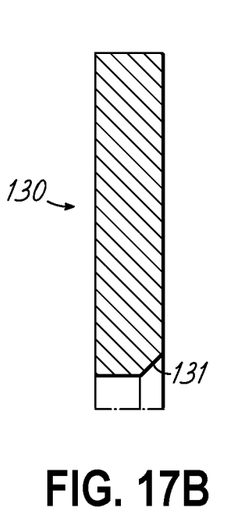
Figure 17C:
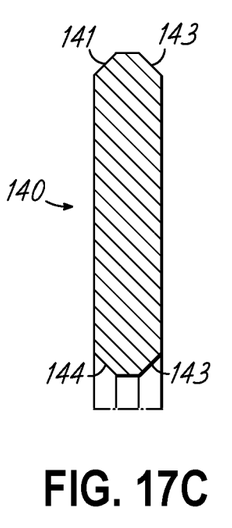
Figure 17D:
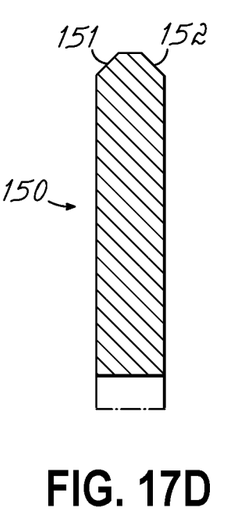

FIG. 15 illustrates an alternate embodiment of a floating integral, solid load ring 110 for a flexible coupling 108 (FIG. 16). This embodiment includes two fully curved ends or edges, 111 and 112. Curved end 111 carries the load from the braid 15. End 112 dissipates the load from end 111 into the end of the coupling 108 (i.e. end of bellows 20 and interlock liner 30).

Referring to FIG. 16, the end of the coupling 108 is shown with ring 110 integrated into the coupling 108 assembly. Ring 110 is held in place against bellows convolution 21 by the end ring 40 and braid 15.

FIG. 17 (i.e. 17A, 17B, 17C and 17D) illustrate four alternative different embodiments of floating, integral, solid load rings according to the invention and with ends or peripheral edges of various configurations somewhat similar to the integrated rings of FIGS. 13 and 15.

Ring 120 is rectangular in cross-section, ring 130 is rectangular with a clipped annular edge 131. Ring 140 is generally rectangular in cross-section but with four clipped annular edges 141-144. Ring 150 is generally rectangular in cross-section with two annular clipped edges 151,152.

Each ring of FIGS. 13, 15 and 17A-17D have outer and inner peripheral edges as shown.

Each of the floating load rings 120, 130, 140 and 150 are used in a flexible coupling as in the prior Figures, the respective ring captured with an upper or outer edge supporting a braid 15, and the lower or inner edge dissipating load from a braid 15 onto an end of a flexible coupling such as onto an annular end 23 of a bellows as shown in prior figures and end of an interlock liner 30 without welding or fixed attachment to any element of the flexible coupling.

Figure 18:
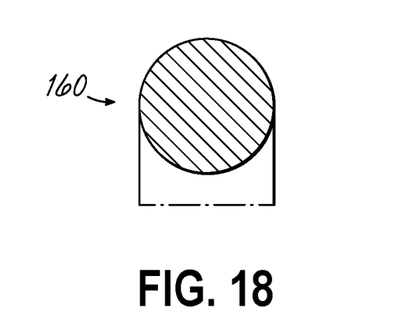
FIG. 18 is a cross-section of an alternate embodiment of a load ring of the invention.
Figure 19:
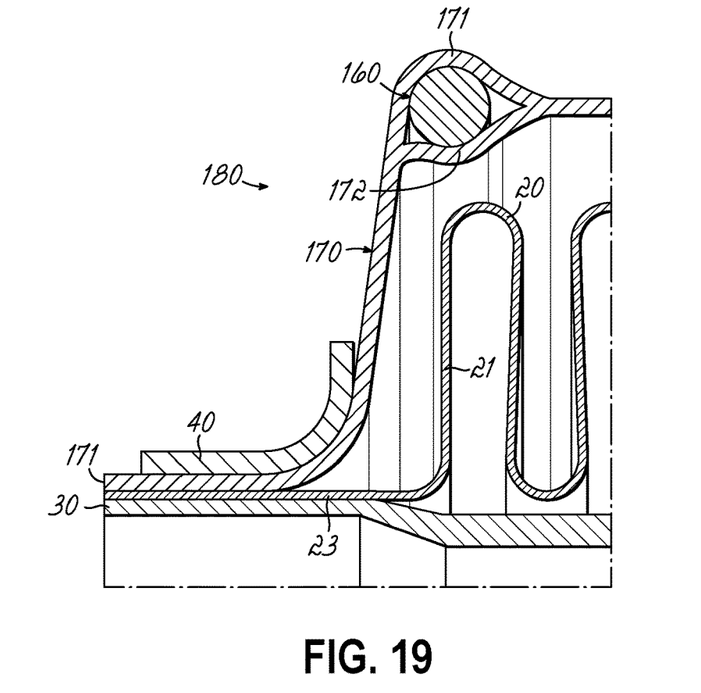
FIG. 19 is a cross-section of the invention in FIG. 18 shown in place in an end of a full flexible coupling assembly.
Figure 20:
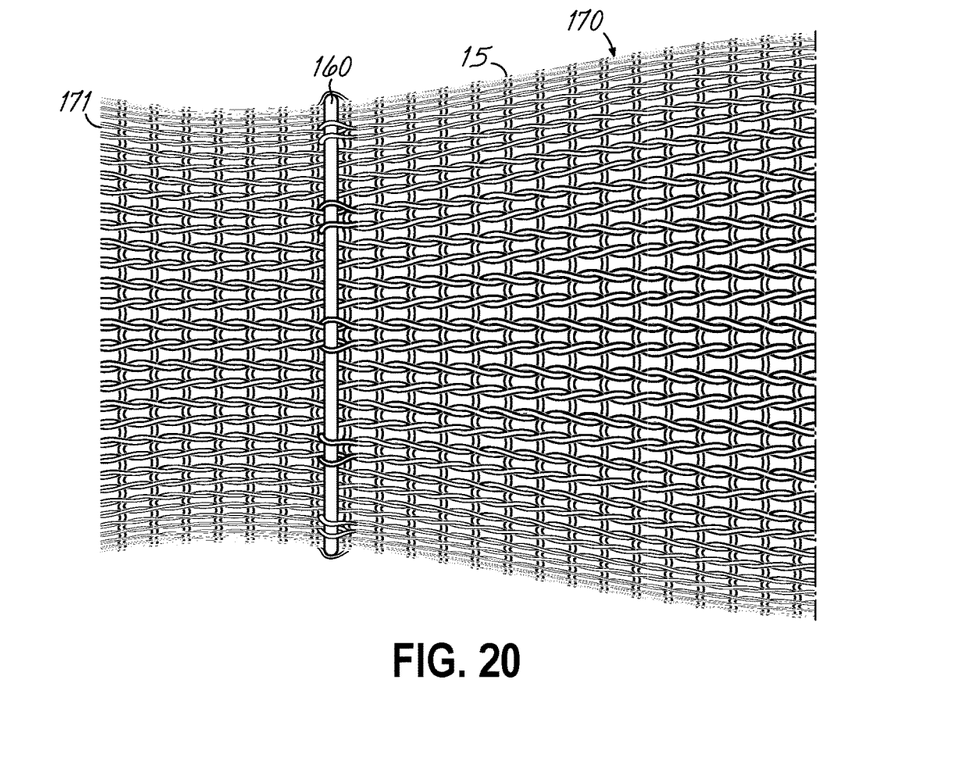
FIG. 20 illustrates in elevational detail a woven mesh sleeve about the ring of FIGS. 18 and 19, and showing only the mesh and ring for clarity.

FIGS. 18, 19 and 20 show one embodiment of a solid, integral annular load ring 160 circular in cross-section. This embodiment includes a halo-shaped annular ring 160 that is embedded into a mesh 170 by interlacing and alternating the mesh loops around the halo ring 160 near mesh end 171 (FIG. 20). Halo ring 160 carries the load from the mesh 170 when the flex coupling 180 is pulled in extension preventing the mesh 170 from contacting the bellows 20. In this regard, the loops 171, 172 of mesh 170 diverge on either side of ring 160 as shown in FIG. 19.

FIGS. 19 and 20 are illustrative of the encapsulation of a ring 160 within mesh 170.

It will thus be appreciated in all embodiments that similar components are referred to by similar numerical designations, and that all the disclosed load rings are universally free-floated, and load dissipating, where loads are exerted by forces in the mesh caused by a variety of forces on the associated couplings, and dissipated by the rings onto end components of the couplings. This function spaces the braids or mesh from the outer crowns or outer surfaces of the bellows convolutions, reducing or preventing undue vibration, wear, fatigue or failure of the flexible coupling and bellows.

These and other modifications and alternatives will be readily appreciated by those of ordinary skill in the art to which this invention pertains, without departing from the spirit or scope of the invention and applicant intends to be bound only by the claims appreciated hereto.

Finally it will be appreciated as described herein that the rings as described are held in place in the couplings by engagement of the components facing the rings, such as the braid and the bellows without physical connection of the ring to the coupling such as by welding, crimping, inter-engaging structural interlock or the like, the rings simply being placed in position and held therein by engagement thereof by coupling elements. This permits use of free-floating load bearing rings in coupling without particular coupling modification dependent on a ring or its usage.

What is claimed is:

1. A method of forming a flexible coupling having an over braid, a bellows having a plurality of convolutions, an end ring, and a liner, the method comprising the steps of:
    positioning a floating load ring between an endmost convolution of the bellows proximate a first annular end of the bellows and the over braid proximate said first annular end of the bellows, wherein said positioning step further comprises:
    engaging a first radially extending annular portion of said floating load ring along and against a radially extending surface of said endmost convolution of said bellows to define a first engagement region,
    engaging a second portion of said floating load ring against the over braid to define a second engagement region, the second engagement region having a section radially outboard of the end ring,
    engaging a third portion of the floating load ring against the over braid to define a third engagement region, the third engagement region having a section radially inboard of an outmost extent of the end ring and non-parallel to a longitudinal axis of the coupling, wherein the first, second, and third engagement regions are between the radially extending surface of the endmost convolution of the bellows and the first annular end of the bellows, and
    holding said floating load ring between said endmost convolution of the bellows and the over braid, wherein said floating load ring is engaged with, but is without physical attachment to said bellows, thereby supporting said over braid radially away from said endmost convolution of said bellows.

2. A method as in claim 1 including orienting a second floating load ring between said over braid and an endmost convolution of said bellows at a second annular end of said bellows, said load rings disposed in a position spacing the over braid radially away from all said plurality of convolutions.

3. A method as in claim 1 wherein said over braid is a flexible mesh.

* * * * *